United States Patent [19]

Hasuo et al.

[11]  4,339,557
[45]  Jul. 13, 1982

[54] PROCESS FOR PRODUCING PROPYLENE-ETHYLENE BLOCK COPOLYMER

[75] Inventors: Masayoshi Hasuo, Yokohama; Yoshinori Suga, Machida; Kazuhisa Kojima, Yokohama; Masatoshi Suzuki, Fujisawa, all of Japan

[73] Assignee: Mitsubishi Chemical Industries, Ltd., Tokyo, Japan

[21] Appl. No.: 183,454

[22] Filed: Sep. 2, 1980

[30] Foreign Application Priority Data

Oct. 24, 1979 [JP] Japan .............................. 54-137469

[51] Int. Cl.³ .......................................... C08F 297/08
[52] U.S. Cl. .................................. 525/247; 525/323
[58] Field of Search ........................ 525/245, 247, 323

[56] References Cited

U.S. PATENT DOCUMENTS

| | | | |
|---|---|---|---|
| 3,318,976 | 5/1967 | Short | 525/247 |
| 3,358,056 | 12/1967 | Renaudo | 525/269 |
| 3,401,212 | 9/1968 | Griffin | 525/323 |
| 3,859,387 | 1/1975 | Perry | 525/245 |
| 3,873,642 | 3/1975 | Jezl | 525/323 |
| 3,970,719 | 7/1976 | Edmonds | 525/247 |
| 4,066,718 | 1/1978 | Saito | 525/323 |

Primary Examiner—Paul R. Michl
Attorney, Agent, or Firm—Oblon, Fisher, Spivak, McClelland & Maier

[57] ABSTRACT

A propylene-ethylene block copolymer is produced in the presence of a catalytic system essentially comprising an organoaluminum compound and a solid titanium trichloride catalytic complex having an atomic ratio of Al to Ti of less than 0.15 and having a complexing agent in two stages of polymerization;

(a) a first stage for polymerizing propylene in the presence of a liquid propylene and hydrogen to produce a propylene homopolymer having a melt flow index of 1 to 150 at a ratio of 70 to 95% by weight based on a total of polymers; and (b) a second stage for copolymerizing propylene and ethylene in the presence of hydrogen and a liquid propylene at a concentration of propylene in vapor phase based on a total of propylene and ethylene in vapor phase of 50 to 85 mol. % and at a concentration of hydrogen in vapor phase based on a total of propylene and ethylene in vapor phase of 0.5 to 30 mol %, to produce ethylene-propylene copolymer having a melt flow index of $10^{-7}$ to 0.1 at a ratio of 5 to 30% by weight based on a total of polymers.

9 Claims, No Drawings

PROCESS FOR PRODUCING PROPYLENE-ETHYLENE BLOCK COPOLYMER

BACKGROUND OF THE INVENTION

1. Field of the Invention

The present invention relates to a process for producing a propylene-ethylene block copolymer. More particularly, it relates to an improved process for producing a hetero-block copolymer in which an ethylene-propylene random copolymer is bonded to a polypropylene main chain.

2. Description of the Prior Art

It has been known to obtain a hetero-block copolymer by two stage polymerizations in which propylene is polymerized in a diluent such as an inert liquid hydrocarbon in the presence of a catalyst comprising titanium trichloride and an organoaluminum compound as Ziegler-Natta catalyst in the first stage and then, ethylene and propylene are random-copolymerized in the presence of the propylene homopolymer in the second stage.

The titanium trichlorides used by these conventional processes have been obtained by reducing titanium tetrachloride with an organoaluminum compound or a metallic aluminum or further heat-treating and pulverizing the product, and they are especially the products referred as $TiCl_3$-AA. When these titanium trichlorides are used, polymerization activities are not satisfactory and contents of non-crystalline polymers as by-products are much. It is not possible to provide satisfactorily high productivity per a catalyst because of the low polymerization activity. Therefore, it is necessary to separate catalyst residues from the polymer by dissolving the catalyst residues into a diluent by treating a slurry of the polymer with an alcohol etc. and separating the polymer from the diluent after the polymerization. The non-crystalline polymers as the by-products are preferably removed from the polymer product because high rigidity as one of important characteristics of polypropylene is lowered by the non-crystalline polymers. An amount of the non-crystalline polymers increases in a copolymerization of propylene-ethylene block copolymer. This causes to decrease a yield of the object polymer and also to adhere a rubber-like polymer on an inner wall of a reactor and to aggregate particles of the polymer and to clog pipes etc., whereby a stable continuous operation is prevented.

Thus, it further requires processes for separating and recovering the alcohol used for the separation of the catalyst residues and the non-crystalline polymers from the diluent to increase costs for producing the object polymer.

The advantageous physical characteristics of the block copolymers are to have remarkably improved impact strength and brittleness at low temperature without substantial decrease of high rigidity which is the advantageous characteristic of a propylene homopolymer. As shown in Japanese Examined Patent Publication No. 31119/1972, the impact strength is improved depending upon an increase of a ratio of propylene to ethylene in the second stage, however, a formation of the non-crystalline polymer is also increased. Only 80 to 90% of the object block copolymers has been recovered from the diluent solution of the polymers.

It has been proposed to decrease a formation of the non-crystalline polymers by polymerizations to produce a block copolymer in which a crystalline propylene polymer is produced at a ratio of more than 90% by weight based on the total polymers in the first stage as disclosed in Japanese Examined Patent Publication No. 1836/1964. Such process for forming ethylene-propylene random copolymer at a relatively low ratio in the second stage causes inferior effect for improving the impact strength as one of the important characteristics of the block copolymer.

It has been proposed to increase concentrations of monomers, that is, to use liquid propylene as the monomer instead of an inert liquid hydrocarbon as a diluent as one process for increasing a productivity of the polymer per the catalyst. In accordance with such process, the productivity of the polymer per the catalyst can be increased, however, it is not enough high because the polymerization activities are not so high when the conventional titanium trichloride which is obtained by reducing titanium tetrachloride with a metallic aluminum and which has a formula of $TiCl_3.\frac{1}{3}AlCl_3$ so called $TiCl_3$-AA is used. As it is found in Japanese Examined Patent Publication No. 32414/1971, the productivity of the polymer is only about 5 kg. per 1 g. of titanium trichloride.

Moreover, it is difficult to increase a content of ethylene component in the ethylene-propylene random copolymer since the random copolymerization of ethylene and propylene is carried out in the liquid propylene as one of the comonomers. Various processes for increasing the content of ethylene component have been proposed. For example, in Japanese Examined Patent Publication No. 10116/1978, a random copolymerization of ethylene and propylene is carried out at a low temperature of $-45.6°$ to $23.9°$ C. ($-50°$ to $75°$ F.) in the second stage, to increase a content of ethylene component. When the copolymerization is carried out at such low temperature, a polymerization velocity is remarkably low and a special cooling apparatus for maintaining the reactor at such low temperature is required. This is remarkably disadvantageous for an industrial operation.

In Japanese Examined Patent Publication No. 32414/1971, the vapor phase is discharged from the reactor and then, a new vapor phase is fed into the reactor in the random copolymerization of ethylene and propylene in the second stage to increase the content of ethylene component. In this process a compressor for recycling the vapor phase is needed.

The inventors have studied to develop an advantageous industrial process for a block-copolymerization in liquid propylene in a main stage to provide a large content of ethylene component in the ethylene-propylene random copolymer formed in the second stage.

SUMMARY OF THE INVENTION

It is an object of the present invention to provide a process for producing a propylene-ethylene block copolymer which has excellent powdery characteristics in which a formation of non-crystalline polymers is minimized and a separation of a catalyst residue is simplified or eliminated by using a specific catalyst having high catalytic activity.

It is another object of the present invention to provide a process for producing a propylene-ethylene block copolymer which has excellent characteristics such as high rigidity and high impact strength and low brittle point temperature and has excellent surface condition (texture of surface) of a melt extruded product, by selecting concentrations of propylene in the vapor phase in the stages and using hydrogen as a molecular weight regulating agent in the stages.

The foregoing and other objects of the present invention have been attained by providing a process for producing a propyleneethylene block copolymer in the presence of a catalytic system essentially comprising an organoaluminum compound and a solid titanium trichloride catalytic complex having an atomic ratio of Al to Ti of less than 0.15 and having a complexing agent in two stages of polymerization which comprises (a) a first stage for polymerizing propylene in the presence of a liquid propylene and hydrogen to produce a propylene homopolymer having a melt flow index of 1 to 150 at a ratio of 70 to 95% by weight based on a total of polymers; and (b) a second stage for copolymerizing propylene and ethylene in the presence of hydrogen and a liquid propylene at a concentration of propylene in vapor phase based on a total of propylene and ethylene in vapor phase of 50 to 85 mol % and at a concentration of hydrogen in vapor phase based on a total of propylene and ethylene in vapor phase of 0.5 to 30 mol % to produce ethylene-propylene copolymer having a melt flow index of $10^{-7}$ to 0.1 at a ratio of 5 to 30% by weight based on a total of polymers.

DETAILED DESCRIPTION OF THE PREFERRED EMBODIMENTS

The solid titanium trichloride catalytic complex used as a catalyst in the present invention has an atomic ratio of Al to Ti of less than 0.15 preferably less than 0.1 especially less than 0.02 and comprises a complexing agent. The complexing agent is incorporated at a molar ratio of more than 0.001 preferably more than 0.01 based on TiCl$_3$ in the solid titanium trichloride catalytic complex. In particularly, it comprises titanium trichloride and an aluminum halide having the formula $$AlR_p^3X_{3-p}$$ 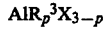

(R$^3$ represents a C$_1$–C$_{20}$ hydrocarbon moiety and X represents a halogen atom and $0 \leq p \leq 2$) at an atomic ratio of Al to Ti of less than 0.15 and the complexing agent at a molar ratio of more than 0.001 based on a total of the aluminum halide and titanium trichloride. For example, it is shown by the formula $$TiCl_3(AlR_p^3X_{3-p})_s \cdot (C)_t$$ 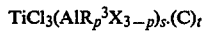

wherein R$^3$ represents a C$_1$–C$_{20}$ hydrocarbon moiety; X represents a halogen atom; $0 \leq p \leq 2$; C represents a complexing agent; s is less than 0.15 and t is more than 0.001. It is possible to incorporate a small amount of iodine, a compound formed by substituting a part or whole of chlorine atom of titanium trichloride with iodine or bromine; an inorganic carrier made of MgCl$_2$ or MgO; polyolefin powder such as polyethylene and polypropylene beside TiCl$_3$ component, AlR$_p^3$X$_{3-p}$ component and the complexing agent C.

Suitable complexing agents C include ethers, thioethers, ketones, carboxylic esters, amines, carboxylic amides, and polysiloxanes. The ethers and thioethers are especially preferable. The ethers and thioethers are particularly compounds having the formula $$R^4{-}O{-}R^5 \text{ or } R^4{-}S{-}R^5$$ 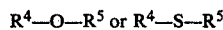

wherein R$^4$ and R$^5$ respectively represent hydrocarbon moieties having 15 or less of carbon atoms. The particular compounds are shown in below.

The typical compounds of AlR$_p^3$X$_{3-p}$ include AlCl$_3$ and AlR$^3$Cl$_2$.

The solid titanium trichloride catalytic complex used in the process of the present invention is preferably a compound which has halo having the maximum intensity at the position corresponding to the peak position of the α type titanium trichloride (2θ=about 32.9°) in its X-ray diffraction. Moreover, it is preferably the solid titanium trichloride catalytic complex produced without heating at a temperature of higher than 150° C. Furthermore, it is preferably to use the solid titanium trichloride catalytic complex having integrated micropore volume of more than 0.02 cm$^3$/g. especially from 0.03 to 0.15 cm$^3$/g. in pore radii of 20 to 500 Å measured by a mercury porosimeter which has fine micropores and a specific integrated micropore volume whereby a separation of non-crystalline polymers can be eliminated.

The solid titanium trichloride catalytic complexes can be easily produced by the following processes:

(a) it is precipitated from a solution of titanium trichloride component dissolved with the ether or the thioether at a temperature of lower than 150° C.; or (b) it is obtained by treatments of a solid titanium trichloride obtained by reducing titanium tetrachloride with an organoaluminum compound and a metallic aluminum, by using a complexing agent and a halide.

The process (a) is known. The solution of titanium trichloride component can be obtained by the following processes:

(A) a process for reducing titanium tetrachloride as the starting material with an organic aluminum in the presence of the ether or the thioether if desired with a desired hydrocarbon; or (B) a process for treating a solid titanium trichloride as the starting material with the ether or the thioether if desired, with a desired hydrocarbon.

The ethers and thioethers are described above and preferably the compounds having the above-identified formula $$R^4{-}O{-}R^5 \text{ or } R^4{-}S{-}R^5$$ 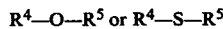

wherein R$^4$ and R$^5$ respectively represents an alkyl group preferably a straight alkyl group; such as ethyl, n-propyl, n-butyl, n-amyl, n-hexyl, n-heptyl, n-octyl, n-decyl and n-dodecyl group; an alkenyl group preferably a straight alkenyl group such as butenyl and octenyl group; a aryl group such as tolyl, xylyl and ethylphenyl group; and an aralkyl group such as benzyl group. The optimum ethers and thioethers include dialkyl ethers, dialkenyl ethers, alkyl alkenyl ethers and dialkyl thioethers.

Suitable hydrocarbon solvents include saturated aliphatic hydrocarbons such as n-pentane, n-hexane, n-heptane, n-octane, n-dodecane, and liquid paraffin; alicyclic hydrocarbon such as cyclohexane and methylcyclohexane; and aromatic hydrocarbons such as benzene, toluene and xylene. This is mainly selected depending upon the kind of the ether. For example, when the ether or thioether having a C$_3$–C$_5$ alkyl or alkenyl group as at least one of R$^4$ and R$^5$ of the formula is used, an aromatic hydrocarbon is preferably selected or an alicyclic hydrocarbon can be selected. When the ether or thioether having an alkyl or alkenyl group having 6 or more carbon atoms as $R^4$ and $R^5$ of the formula is used, a saturated aliphatic hydrocarbon is preferably selected.

The organoaluminum compound used in the process (A) can be the compounds having the formula $$AlR_q^6X_{3-q}$$

($R^6$ represents a $C_1-C_{20}$ hydrocarbon moiety; q is 1 to 3; X represents a halogen atom). The organoaluminum compound is used at a molar ratio of Ti in titanium tetrachloride to the hydrocarbon moiety ($R^6$) in the organoaluminum compound of 1:0.1 to 1:50 preferably 1:0.3 to 1:10. The ether or thioether is used at a molar ratio of ether to titanium tetrachloride of 1:0.05 to 1:5 preferably 1:0.25 to 1:2.5. The reduction is not critical. The three components are mixed in a desired order at a temperature of 0° to about 50° C. to form the solution. When a small amount of iodine, titanium tetraiodide or titanium tetrabromide is incorporated at a molar ratio of about 0.005 to 0.3 based on titanium tetrachloride, the precipitated solid titanium trichloride catalytic complex has remarkably high catalytic activity to produce a polymer having high isotactic property.

The solid titanium trichloride used in the process (B) can be titanium trichloride obtained by reducing titanium tetrachloride with hydrogen gas or aluminum preferably titanium trichloride obtained by reducing titanium tetrachloride with an organoaluminum compound.

The ether or thioether is usually used at a molar ratio of titanium trichloride to the ether or thioether of 1:1 or more preferably 1:1 to 5. The treatment with the ether or thioether is usually carried out at 0° to 100° C. preferably about 20° to 50° C.

In the process (a), the fine solid titanium trichloride catalytic complex is precipitated from the solution of the titanium trichloride component dissolved in the process (A) or (B) at a temperature of 150° C. or lower. The process is not critical. The solution is heated, if desired after admixing with a hydrocarbon diluent, at a temperature of lower than 150° C. usually 20° to 150° C. preferably 40° to 120° C. especially 60° to 100° C. to precipitate it. When the molar ratio of a total of Ti component and Al component to the ether or thioether in the solution of titanium trichloride component is less than 1, the precipitation can be promoted by adding a liberating agent i.e. a precipitating agent. The precipitating agent can be compounds having a function for precipitating a solid titanium trichloride by reacting with the ether or thioether component which is complexed to titanium trichloride in the solution, for example, Lewis acids having acidity of higher than that of titanium trichloride, such as titanium tetrachloride, boron trifluoride, boron trichloride, vanadium tetrachloride, aluminum trichloride, alkylaluminum dihalide, alkylaluminum sesquihalide, and dialkylaluminum halide. It is optimum to use titanium tetrachloride, aluminum halides such as aluminum trihalides, and alkylaluminum dihalides. The precipitating agent is preferably used at a ratio of less than 5 mole times of Ti component in the solution.

The process (b) is known and will be described in detail.

Titanium tetrachloride is reduced with an organoaluminum compound or a metallic aluminum.

The organoaluminum compound can be the compounds having the formula shown in the process (A) for the process (a). The reduction can be carried out by the known process. When titanium tetrachloride is reduced with the organoaluminum compound, the organoaluminum compound is added to a diluent at a molar ratio of more than 1 preferably 1 to 10 based on titanium tetrachloride at a temperature of about −50° C. to 30° C. and heated to a temperature of −10° to 100° C. to complete the reaction.

When a metallic aluminum is used for the reduction, the metallic aluminum is added to titanium tetrachloride in a diluent such as xylene at a ratio of 0.1 to 1 g. atom of the metallic aluminum to 1 mol. of titanium tetrachloride with a small amount of $AlCl_3$ with or without a diluent such as xylene and the mixture is heated to 80° to 300° C. preferably 100° to 200° C.

In the process (b), the resulting solid titanium trichloride is treated with a complexing agent and with a halide.

The complexing agent can be the above-mentioned compounds C. The halides can be titanium tetrachloride and carbon tetrachloride. The treatment with the complexing agent and the halide can be simultaneously carried out or sequentially carried out such as the halide treatment followed by the complexing treatment. The complexing treatment is usually carried out by adding the complexing agent at a molar ratio of 0.2 to 3 based on $TiCl_3$, to the solid titanium trichloride in the diluent at a temperature of −20° to 80° C. After the complexing treatment, the solid is preferably separated and washed. The treatment with a halide is usually carried out in a diluent at a temperature of −10° to 50° C. The halide is usually used at a molar ratio of 0.1 to 10 preferably 1 to 5 based on $TiCl_3$. After the treatment with the halide, the resulting solid product is preferably separated and washed.

The solid titanium trichloride catalytic complex used in the process of the present invention is preferably produced by the process (a) or (b). In order to produce the catalytic complex having the specific integrated micropore volume, it is preferably produced by the process (a) especially the process (a) with the process (A).

Beside the processes (a) and (b), it is possible to produce the catalytic complex by reducing titanium tetrachloride with an organoaluminum compound and adding the ether at a molar ratio of 0.5 to 5 to the resulting solid titanium trichloride and heating it at 50° to 150° C. and separating the solid product as disclosed in Japanese Unexamined Patent Publication No. 123796/1976.

In the process of the present invention, the solid titanium trichloride catalytic complex is used as the catalyst.

It is not suitable to use, as the catalyst, the pure titanium trichloride ($TiCl_3$) obtained by a hydrogen reduction of titanium tetrachloride titanium trichloride-aluminum trichloride eutectic crystal ($TiCl_3 \cdot \frac{1}{3} AlCl_3$) obtained by reducing titanium tetrachloride with aluminum or mechanically pulverized titanium trichloride.

The organoaluminum compound as the cocatalyst is preferably the compound having the formula $$AlR_n^1Cl_{3-n}$$

($R^1$ represents a $C_1-C_{20}$ hydrocarbon moiety; n is 1.95 to 2.10). It is possible to use diethylaluminum monochloride having ethyl group as $R^1$ and 2 of n. Thus, it is preferably to use the compounds having n-propyl group or n-hexyl group as $R^1$. When $R^1$ is n-propyl or n-hexyl group, it is important that n is in a range of $1.95 \leq n \leq 2.10$. When the specific organoaluminum compound is combined with the solid titanium catalytic complex, a polymerization activity is remarkably high and an isotactic property is remarkably high. When the organoaluminum compound having $n > 2.10$ is combined, the isotactic property is inferior though the polymerization activity is superior. When the organoaluminum compound having $n < 1.95$ is combined, the polymerization activity is inferior though the isotactic property is superior. Both of them are not preferable.

The organoaluminum compound as the cocatalyst can be the mixture of the compounds having n-propyl group and n-hexyl group as $R^1$.

The organoaluminum compounds used as the cocatalyst can be produced by the known processes, for example, a reaction of aluminum trichloride with tri-n-propylaluminum or tri-n-hexylaluminum; or a reaction of a compound having the formula $$AlR_m^2Cl_{3-m}$$

($R^2$ represents n-propyl or n-hexyl group and $0 < m < 3$) with tri-n-propylaluminum, tri-n-hexylaluminum or aluminum trichloride. It is also possible to combine these processes by reacting aluminum trichloride with tri-n-propylaluminum or tri-n-hexylaluminum to produce the compound having the formula $$AlR_m^2Cl_{3-m}$$

(m is about 0.9 to 2.1) and then, reacting it with a small amount of tri-n-propylaluminum, tri-n-hexylaluminum or aluminum trichloride to produce the compound having a desired value of n.

The reaction temperature is in a range of the ambient temperature to 150° C. preferably 50° to 100° C. and a reaction time is in a range of several min. to several hr. preferably 1 to 2 hr. The reaction can be carried out without any medium. It is possible to react them in a desired medium such as aliphatic hydrocarbons such as n-hexane and n-heptane; aromatic hydrocarbons such as toluene and xylene; alicyclic hydrocarbons such as cyclohexane and methyl cyclohexane.

When a mixture of trialkylaluminums having the different alkyl groups in $AlR^2_mCl_{3-m}$ is used as the reagent for the second reaction, a mixture of compounds having n-hexyl group and n-propyl group are obtained. After the reaction, the product can be used as the cocatalyst however, it is preferably used after a purification by a distillation under a reduced pressure.

In the process of the present invention, an electron donor as the third component beside the catalyst and the cocatalyst whereby the isotactic property of the polymer can be improved without lowering the polymerization activity.

The electron donors can be compounds having one or more electron donor atom or group such as ethers, polyethers, alkyleneoxides, furan, amines, trialkylphosphines, triarylphosphines, pyridines, quinolines, phosphoric esters, phosphoric amides, phosphineoxides, trialkylphosphite, triarylphosphites, ketones, carboxylic esters and carboxylic amides. It is preferable to use carboxylic esters such as ethyl benzoate, methyl benzoate and phenyl acetate; glycine esters such as dimethylglycine ethyl ester and dimethylglycine phenyl ester; and tri-arylphosphites such as triphenylphosphite and trinonylphosphite etc. As ratios of the catalyst components, a molar ratio of $TiCl_3$ in the solid titanium trichloride catalytic complex to the organoaluminum compound is in a range of 1:1 to 100 preferably 1:2 to 40. When the third component is used, a molar ratio of $TiCl_3$ to the third component is in a range of 1:0.01 to 10 preferably 1:0.05 to 2. Aromatic hydrocarbons such as benzene, toluene and xylene can be used as the third component for the catalyst.

The solid titanium trichloride catalytic complex used as the catalyst, can be used without any treatment, and it is preferable to use it after a pretreatment with a small amount of an olefin such as propylene and ethylene in the presence of an organoaluminum compound. The pretreatment is effective for improving physical properties of a slurry of the polymer such as a bulk density.

The temperature in the pretreatment is lower than the polymerization temperature and is usually in a range of 20° to 60° C. The pretreatment is carried out to provide a ratio of the polymer produced by the pretreatment to $TiCl_3$ in the solid titanium trichloride catalytic complex of 0.1 to 50:1 by weight preferably 1 to 20:1 by weight.

In the process of the present invention, the production of a propylene-ethylene copolymer with the catalyst system comprising the solid titanium trichloride catalytic complex and the organoaluminum compound, is carried out in two stages. In the first stage, a homopolymerization of propylene is carried out in the presence of liquid propylene. It is preferable to use an inert liquid hydrocarbon such as aliphatic-hydrocarbons such as hexane and heptane; alicyclic hydrocarbons such as cyclohexane; and aromatic hydrocarbons such as benzene and toluene to charge the solid titanium trichloride catalytic complex and the organoaluminum compound into the reactor. A small amount of the inert liquid hydrocarbon can be incorporated with the liquid propylene. The polymerization temperature and time are selected so as to give 70 to 95% by weight of propylene homopolymer in the total amount of the polymers. The polymerization temperature is usually in a range of 40° to 100° C. preferably 55° to 80° C. The polymerization pressure is a sum of a vapor pressure of the liquid propylene, a pressure of hydrogen as the molecular weight regulating agent, and a vapor pressure of the inert liquid hydrocarbon used as the diluent for the catalyst components and it is usually in a range of 30 to 40 kg./cm². A polymerization temperature and an amount of the molecular weight regulating agent are selected to produce the propylene homopolymer having a melt flow index of 1 to 150 in the first stage. (The melt flow index is measured by ASTM D1238-70 as a rate of extrusion (g./10 min.) at 230° C. under a pressure of 2.16 kg. and is referred to as MFI.) The molecular weight regulating agent can be hydrogen and dialkyl zinc etc. preferably hydrogen. A concentration of hydrogen in the vapor phase is usually in a range of about 1 to 30 mol %.

In the second stage, a random copolymerization of propylene and ethylene is carried out in the presence of the propylene homopolymer obtained in the first stage and liquid propylene. A concentration of propylene in the vapor phase is in a range of 50 to 85 mol % which is the condition for forming non-crystalline polymers at highest ratio, but the condition for improving an impact strength of the final product in the highest level. In such condition, the powdery block copolymer having high bulk density and high free fluidity can be obtained without substantially adhering on the inner wall of the reactor in the present invention. When the concentration of propylene in the vapor phase is out of the above-mentioned range, an improvement of the impact strength is not satisfactory. When the polymerization is carried out in a concentration of propylene in the vapor phase of 50 to 85 mol %, a content of propylene component in the resulting random copolymer of propylene and ethylene is in a range of 30 to 70% by weight (22 to 61 mol %). The polymerization temperature and time are selected to produce the random copolymer of propylene and ethylene at a ratio of 5 to 30% by weight of the total of the polymers. When it is less than 5% by weight, the improvement for impact strength is not enough high. When it is more than 30% by weight, a bulk density and a free fluidity of the powder are deteriorated to give lower rigidity and transparency and to give a large shrinkage of a molded product. The polymerization temperature is usually selected from the range of 25° to 70° C. preferably 25° to 65° C. When it is higher than 70° C., the resulting propylene-ethylene block copolymer has a poor free fluidity with aggregation of particles of the polymer to be inferior physical properties of the slurry.

The polymerization pressure is a sum of the vapor pressure of the liquid propylene, the pressures of hydrogen and ethylene and the vapor pressure of the inert liquid hydrocarbon at the polymerization temperature and is usually in a range of 10 to 40 kg./cm$^2$. The content of hydrogen as the molecular weight regulating agent and the polymerization temperature are selected so as to produce a random copolymer of propylene and ethylene having MFI of $10^{-7}$ to 0.1. The concentration of hydrogen in the vapor phase is usually in a range of 0.5 to 30 mol %. When MFI is higher than 0.1, the improvement of the impact strength is not satisfactory. When MFI is quite small, such as less than $10^{-7}$, the effect for improving the impact strength is enough high, however, a barus effect in an injection molding is too large and a dimension stability is inferior and a shark skin or fisheyes are formed on a molded product.

The polymerization can be carried out by a continuous system or a batch system.

In the continuous system, different reactors are used for the polymerizations in the stages. The transferring of the slurry of the polymer between the reactors is preferably carried out under a pressure difference or a head difference. The polymerization pressures in the reactors in the stages are preferably selected to be the order of 1st stage≧2nd stage. The pressure in the first or second stages can be increased by charging an inert gas such as nitrogen or argon.

The propylene-ethylene block copolymer obtained by the process of the present invention has high crystallinity with a smaller formation of non-crystalline polymers and accordingly, it is unnecessary to remove the non-crystalline polymers. The block copolymer product has excellent impact strength and rigidity and brittleness at low temperature even though the non-crystalline polymers are not removed. A productivity of the propylene-ethylene block copolymer is more than 16,000 g. especially more than 22,000 g. per 1 g. of TiCl$_3$ of the catalyst. Therefore, the catalyst residue of TiCl$_3$ remained in the block copolymer product is less than 19 ppm especially less than 14 ppm as Ti. It is unnecessary to remove the titanium component. After the polymerization in the second stage, the powdery propylene-ethylene block copolymer is in a form of a slurry in liquid propylene as a medium. It is unnecessary to remove the non-crystalline polymers and the Ti component of the catalyst residue, whereby it is unnecessary to use an inert liquid hydrocarbon or alcohol. After the polymerizations, all of liquid propylene is vaporized or the block copolymer is separated by a precipitation and then liquefied propylene is vaporized. This can be directly pelletized or pelletized after a simple treatment contacting a small amount of a gaseous alkyleneoxide with the powdery copolymer at 80° to 120° C. for several min. as disclosed in Japanese Unexamined Patent Publication No. 25888/1977 so as to remove chlorine in the catalyst residue. The powdery copolymer can be used as the powder grade product without any pelletization.

In a continuous stable operation for a long time by the process of the present invention, the powdery characteristics of the powdery copolymer containing the catalyst residue in the polymerization system should be a bulk density of more than 0.35 g./cm$^3$ preferably 0.40 g./cm$^3$ at 30° to 130° C. and a repose angle of 30° to 50° preferably 30° to 45° and a slip angle of 25° to 50° preferably 25° to 43° and an average particle diameter of more than 100$\mu$ preferably more than 200$\mu$.

In order to produce the powdery copolymer, the solid titanium trichloride catalytic complex obtained by the process (a) or (b) especially the process (a) can be used.

The repose angle and the slip angle can be measured on a ground stainless steel plate as the angle for maintaining the stable state and the angle for initiating the slippage as described in Shin Kagaku Kogaku Koza published by Nikkan Kogyo News Paper Co. Vol. 18 page 5 to 8. The invention will be further illustrated by certain Examples and References which are provided herein for purpose of illustration only and are not intended to be limiting in any manner unless otherwise specified.

In the Examples, the symbols and the measurements are as follows.

A catalystic efficiency CE (g./g.) is given as a ratio of an yield of the copolymer g. per 1 g. of TiCl$_3$ of the catalyst.

An isotactic index I.I. (%) is given as a weight percent of a solid residue (wt.%) after an extraction with boiled n-heptane for 6 hr. by an improved Soxhlet extractor. The non-crystalline polymers are soluble in the boiled n-heptane and accordingly, I.I (%) shows an yield of the crystalline polymer.

A bulk density $\rho_B$(g./cc.) is measured by Japanese Industrial Standard-6721.

A content of the ethylene component in the copolymer $[E]_{IR}$(%) is measured by a ratio of the peak value at 4396 cm$^{-1}$ and the peak value at 4325 cm$^{-1}$ in an infrared spectrum of a press-sheet having a thickness of 0.2 mm.

A melt flow index MFI (g./10 min.) is measured by ASTM D-1233-70 at 230° C. under a pressure of 2.16 kg. as a rate of the extrusion.

A density $\rho$(g./cc.) is measured by a density gradient tube process pursuant to ASTM-D 1505.

A first yield strength YS (kg./cm$^2$) is measured by a tensile test of a dumbbel specimen obtained by punching from a pressed sheet having a thickness of 1.0 mm pursuant to ASTM D-638-72. This is measured at 20° C. otherwise specified.

An Izod impact strength (kg.cm/cm) is measured by using a notched rectangular specimen obtained by punching from a pressed sheet having a thickness of 5.0 mm. pursuant to ASTM D-256. This is measured at 20° C. otherwise specified.

A breaking point elongation (%) at a welded part is measured by a tensile strength test for a two point gate dumbbel specimen having a thickness of 3 mm obtained by an injection molding machine (1 ounce). This corresponds to the strength at the welded part.

A brittle point temperature $T_b$(°C.) is measured by using a specimen obtained by punching a flat sheet having a thickness of 2.0 mm obtained by an injection molding machine (1 ounce) pursuant to ASTM D-746.

In the following Examples and References, MFI in the second stage is measured after the independent polymerization in the second stage. When MFI is more than 0.001, it is measured pursuant to D-1238-70. When MFI is lower than 0.001, [η] is measured and MFI is calculated in a relation of MFI and [η].

A concentration of propylene in vapor phase is shown as mol % for a molar ratio of propylene to a total of propylene and ethylene in vapor phase. A concentration of hydrogen in vapor phase is shown as mol % for a molar ratio of hydrogen to a total of propylene and ethylene in vapor phase.

Preparation of Catalyst 1

Preparation of Solid Titanium Trichloride Type Catalytic Complex (A) Preparation of Solution of Titanium Trichloride Into a 500 ml. four necked flask dried and purged with argon, 120 ml. of n-heptane and 100 m mol of TiCl$_4$ were charged and then 90 m mol of di-n-octyl ether was added and the mixture was stirred at 25° C. and a solution of 33 m mol of diethylaluminum monochloride in 50 ml. of n-heptane was gradually added dropwise to obtain a greenish black-brown solution of titanium trichloride in n-heptane.

(B) Preparation of Precipitation of Titanium Trichloride and Preparation of Catalyst The solution of titanium trichloride obtained in the step (A) was heated to 95° C. during the heating step, a precipitation of titanium trichloride having purple color was found. After stirring the solution at 95° C. for 30 min., the precipitate was separated by a filtration and washed with 100 ml. of n-heptane for two times. The precipitate was further washed with 100 ml. of toluene for 3 times to obtain fine purple solid titanium trichloride type catalytic complex.

According to an elementary analysis, the catalytic complex had a formula TiCl$_3$(AlCl$_3$)$_{0.003}$[(n-C$_8$H$_{17}$)$_2$O]$_{0.10}$.

According to a measurement of X-ray diffraction spectrum of the catalytic complex by CuKα-ray, it had halo having the maximum intensity at $2\theta = 32.9°$.

According to a measurement of an integrated micropore porosity by a mercury porosimeter (60,000 psig.), it was 0.04 cm$^3$/g. in pore radii of 20 to 500 Å.

Preparation of Catalyst 2

Preparation of Solid Titanium Trichloride Type Catalytic Complex (A) Preparation of Solution of Titanium Trichloride Into a 500 ml. four necked flask dried and purged with argon, 90 ml. of pure toluene and 90 m mol of titanium tetrachloride were charged and then, 85 m mol of di-n-butyl ether was added whereby a slight exothermic reaction of titanium tetrachloride and di-n-butyl ether was performed to be dissolved into toluene and an orangish yellow solution was obtained. The solution was stirred at 25° C. and a solution of 45 m mol of diethyl aluminum monochloride in 20 ml. of toluene was gradually added to obtain a dark orange solution of titanium trichloride.

(B) Preparation of Titanium Trichloride and Preparation of Catalyst

The solution of titanium trichloride obtained in the step (A) was heated to 95° C. During the heating, a purple titanium trichloride precipitate was formed. The mixture was stirred at 95° C. for 30 min. and the precipitate was separated by a filtration and washed with 100 ml. of toluene for 1 time and then washed with 100 ml. of n-heptane for 5 times to obtain a fine purple titanium trichloride type catalytic complex. According to an elementary analysis, the catalytic complex had the formula TiCl$_3$(AlCl$_3$)$_{0.004}$[(n-C$_4$H$_9$)$_2$O]$_{0.05}$.

According to a measurement of X-ray diffraction spectrum by CuKα-ray, it has halo having the maximum intensity at $2\theta = 32.9$.

Preparation of Catalyst 3

Preparation of Solid Titanium Trichloride Type Catalytic Complex (A) Preparation of Reduced Solid In a 500 ml. four necked flask purged with argon, 45 ml. of n-hexane and 100 m mol of titanium tetrachloride were charged and were cooled at 0° C. and stirred, and a solution of 200 m mol of ethylaluminum sesquichloride in 70 ml. of n-hexane was added dropwise for 30 min. After the addition, the mixture was stirred at 0° C. for 2 hours to perform the aging. The product was washed with 100 ml. of n-hexane for 5 minutes to obtain 21 g. of a reddish purple solid.

(B) Complexing Treatment

The reddish purple solid obtained in the step (A) was admixed with 150 ml. of n-hexane and 21 ml. of diisoamyl ether and the mixture was stirred at 30° C. for 1 hr. The product was washed with 100 ml. of n-hexane for 5 times and dried under a reduced pressure to obtain 21 g. of a brown product.

(C) Treatment With Titanium Tetrachloride

The brown product obtained in the step (B) was admixed with 400 m mol of titanium tetrachloride to react them at 35° C. for 1.5 hr. and the product was washed with 100 ml. of n-hexane for 8 times to obtain about 20 g. of a purple solid TiCl$_3$ type catalytic complex.

According to an elementary analysis, the product had the formula TiCl$_3$(AlCl$_3$)$_{0.01}$[(i-C$_5$H$_{11}$)$_2$O]$_{0.11}$.

According to a measurement of X-ray diffraction spectrum by CuKα-ray, it had halo having the maximum intensity at $2\theta = 32.9°$.

According to a measurement of an integrated micropore porosity by a mercury porosimeter, it was 0.16 cm$^3$/g. in pore radii of 20 to 500 Å.

EXAMPLE 1

A 2 liter induction stirring type autoclave equipped with an anchor type stirrer was used.

Into the autoclave which was dried, evacuated and purged with nitrogen and then purged with propylene gas, 2.0 m mol of di-n-propylaluminum monochloride was charged and hydrogen gas was fed under a pressure of 3.3 kg./cm$^2$ and then 700 g. of liquid propylene was charged. The autoclave was heated. When the temperature in the autoclave reached to 70° C., 4 ml. of a slurry of the solid titanium trichloride catalytic complex obtained by Preparation of Catalyst 1, (20 mg. as TiCl₃) in toluene was charged under nitrogen gas pressure. This was considered to be the initiation of the polymerization in the first stage. The polymerization was continued at 70° C. for 3.5 hr. A total pressure was 33.3 kg./cm² gauge. After 3.5 hr., the liquid propylene and hydrogen gas were purged to be zero kg./cm² (gauge) of an inner pressure of the autoclave. A siphon was equipped in nitrogen gas atmosphere, to sample several g. of the powdery propylene homopolymer under nitrogen gas pressure. A Ti content of the sample was measured by a fluorescent X-ray analysis to calculate an yield of the polymer in the first stage, and MFI of the polymer was measured.

Hydrogen gas was fed into the autoclave and 500 g. of liquid propylene was fed. The temperature in the autoclave was controlled at 40° C. and ethylene gas was fed at a pressure of 10.4 kg./cm². This time was considered to be the initiation of the polymerization in the second stage. The polymerization was continued at 40° C. for 0.5 hr.

During the polymerization, ethylene gas was continuously fed to maintain an ethylene partial pressure of 10.4 kg./cm². The total pressure was 28.5 kg./cm² (gauge). A concentration of propylene in the vapor phase was an average of 60 mol % and a concentration of hydrogen in the vapor phase was an average of 4.1 mol %.

After 0.5 hr., the liquid propylene, ethylene gas and hydrogen gas were purged to obtain 474 g. of white powdery propylene-ethylene block copolymer which had excellent free fluidity without aggregated mass. The conditions of the polymerizations and the data of the measurements are shown in Table 1.

The powdery copolymer had a bulk density $\rho_B$ of 0.44 g./cc. and I.I. of 95.3. These values were slightly lower than the values of the propylene homopolymer sampled of the first stage as $\rho_B$ of 0.46 g./cc. and I.I. of 97.4%. The powdery copolymer had an average particle diameter of 450μ and a repose angle of 38° and a slip angle of 35°.

On the other hand, in physical characteristics, a first yield strength and an Izod impact strength of the product were remarkably high even though non-crystalline polymers were not separated. A brittle point temperature was remarkably low. A catalytic efficiency CE was 22500. A Ti content remained in the copolymer was low enough to be 13.1 ppm which need not to be separated.

EXAMPLES 2 and 3

In accordance with the process of Example 1 except varying the conditions for the polymerization a concentrations of proplyene and hydrogen in vapor phase in the second stage as shown in Table 1. Polymerizations were carried out to obtain propylene-ethylene block copolymers. The results of the measurements are shown in Table 1.

REFERENCE 1

In accordance with the process of Example 1 except varying the conditions for the polymerization in the second stages as shown in Table 1, polymerizations were carried out to obtain a propylene-ethylene block copolymer. When the concentration of propylene in the vapor phase is 46 mol %, a content of propylene component in the propylene-ethylene random copolymer was less than 30% by weight, and an impact strength was not enough high.

TABLE 1

|  | Exp. 1 | Exp. 2 | Exp. 3 | Ref. 1 |
|---|---|---|---|---|
| First stage | | | | |
| Temp. and time for polymerization(°C.; hr.) | 70-3.5 | 70-3.5 | 70-3.5 | 70-3.5 |
| Total pressure for polymerization(kg./cm²) | 33.3 | 33.0 | 32.9 | 33.2 |
| H₂ partial pressure 70° C. (kg./cm²) | 3.3 | 3.0 | 2.9 | 3.2 |
| MFI (g./10 min) | 7.7 | 7.0 | 6.7 | 8.0 |
| Second stage | | | | |
| Temp. and time for polymerization(°C.; hr.) | 40-0.5 | 40-0.5 | 40-1.0 | 40-0.4 |
| Total pressure for polymerization(kg./cm²) | 28.5 | 26.3 | 23.6 | 37.1 |
| H₂ conc. in vapor phase (mol %) | 4.1 | 2.8 | 4.7 | 8.9 |
| C₃H₆ conc. in vapor phase (mol %) | 60 | 65 | 75 | 46 |
| MFI (g./10 min) | $10^{-5}$ | $9 \times 10^{-6}$ | $2 \times 10^{-4}$ | $10^{-5}$ |
| [η] (dl/g.) | 14.1 | 14.3 | 10.5 | 14.1 |
| Total polymer | | | | |
| Yield (g) | 474 | 468 | 480 | 478 |
| Cat. eff. CE (g/g) | 23,700 | 23,400 | 24,000 | 23,900 |
| Weight ratios in 1st-2nd stages (%) | 87-13 | 88-12 | 85-15 | 87-13 |
| Isotactic index I.I. (%) | 95.3 | 95.0 | 95.0 | 95.0 |
| Bulk density $\rho_B$(g./cc) | 0.44 | 0.45 | 0.42 | 0.43 |
| C₂H₄ content [E]$_{IR}$ (%) | 4.7 | 3.9 | 3.9 | 5.6 |
| MFI (g./10 min) | 2.4 | 2.4 | 2.8 | 2.5 |
| Density $\rho$(g./cc) | 0.902 | 0.902 | 0.899 | 0.901 |
| 1st yield strength YS (kg./cm²) | 269 | 274 | 256 | 227 |
| Izod impact strength (kg.cm/cm) | 17.3 | 16.7 | 19.1 | 9.5 |
| Breaking point elongation at welded part (%) | 590 | 592 | 612 | 592 |
| Brittle point temp. $T_b$ (°C.) | −24 | −21 | −22 | −20 |

REFERENCES 2 and 3

In accordance with the process of Example 1 except varying the conditions for the polymerizations in the second stage as shown in Table 2, polymerizations were carried out to obtain propylene-ethylene block copolymers. The results of the measurements are shown in Table 2. In Reference 2, (0.05 mol % of the concentration of hydrogen in the vapor phase in the second stage), a shark skin was formed on the surface of the molten extruded product and a fabricatability was not satisfactory. In Reference 3, the propylene-ethylene random copolymer formed in the second stage had high MFI and the improvement for the impact strength was not satisfactory.

EXAMPLES 4 and 5

In accordance with the process of Example 1 except varying the concentration of hydrogen in the vapor phase in the first stage and a ratio of the propylene-ethylene random copolymer in the second stage, polymerizations were carried out. The results of the measurements are shown in Table 2.

Propylene-ethylene block copolymers having each improved impact strength were respectively obtained.

TABLE 2

|  | Ref. 2 | Ref. 3 | Exp. 4 | Exp. 5 |
|---|---|---|---|---|
| First stage | | | | |
| Temp. and time for | 70-3.5 | 70-3.5 | 70-3.5 | |

TABLE 2-continued

|  | Ref. 2 | Ref. 3 | Exp. 4 | Exp. 5 |
|---|---|---|---|---|
| polymerization(°C.; hr.) | | | | |
| Total pressure for polymerization(kg./cm$^2$) | 37.8 | 32.3 | 36.7 | 36.8 |
| H$_2$ partial pressure 70° C. (kg./cm$^2$) | 7.8 | 2.3 | 6.7 | 6.8 |
| MFI (g./10 min) | 110 | 3.1 | 78.7 | 79.0 |
| Second stage | | | | |
| Temp. and time for polymerization(°C.; hr.) | 40-0.5 | 40-2.0 | 40-0.6 | 40-1.1 |
| Total pressure for polymerization(kg./cm$^2$) | 26.7 | 31.0 | 26.1 | 26.1 |
| H$_2$ conc. in vapor phase (mol %) | 0.05 | 40 | 2.7 | 2.7 |
| C$_3$H$_6$ conc. in vapor phase (mol %) | 60 | 61 | 66 | 66 |
| MFI (g./10 min) | — | 0.15 | $1 \times 10^{-5}$ | $1 \times 10^{-5}$ |
| [η] (dl/g.) | — | 2.4 | 14.1 | 14.1 |
| Total polymer | | | | |
| Yield (g) | 453 | 463 | 482 | 506 |
| Cat. eff. CE (g/g) | 22,700 | 23,200 | 24,100 | 25,300 |
| Weight ratios in 1st-2nd stages (%) | 88-12 | 87-13 | 85-15 | 80-20 |
| Isotactic index I.I. (%) | 95.8 | 94.9 | 95.1 | 94.7 |
| Bulk density $\rho_B$(g./cc) | 0.44 | 0.42 | 0.43 | 0.42 |
| C$_2$H$_4$ content [E]$_{IR}$ (%) | 4.3 | 3.7 | 4.8 | 6.4 |
| MFI (g./10 min) | 2.4 | 2.1 | 14.5 | 8.3 |
| Density ρ(g./cc) | 0.901 | 0.902 | 0.899 | 0.890 |
| 1st yield strength YS (kg./cm$^2$) | 273 | 254 | 265 | 252 |
| Izod impact strength (kg.cm/cm) | 11.2 | 7.8 | 11.5 | 13.3 |
| Breaking point elongation at Welded part (%) | 821 | 811 | 550 | 535 |
| Brittle point temp. T$_b$ (°C.) | −22 | −18 | −22 | −29 |

TABLE 3

|  | Ref. 4 | Ref. 5 | Exp. 6 | Exp. 7 |
|---|---|---|---|---|
| First stage | | | | |
| Temp. and time for polymerization(°C.; hr.) | 70-4.0 | 70-2.5 | 70-3.5 | 70-3.5 |
| Total pressure for polymerization(kg./cm$^2$) | 33.2 | 33.2 | 33.2 | 35.3 |
| H$_2$ partial pressure 70° C. (kg./cm$^2$) | 3.2 | 3.2 | 3.2 | 5.3 |
| MFI (g./10 min) | 7.7 | 7.7 | 8.4 | 33.6 |
| Second stage | | | | |
| Temp. and time for polymerization(°C.; hr.) | 40-0.2 | 40-2.0 | 40-0.6 | 40-0.6 |
| Total pressure for polymerization(kg./cm$^2$) | 28.5 | 30.9 | 25.9 | 26.4 |
| H$_2$ conc. in vapor phase (mol %) | 4.0 | 15.2 | 1.8 | 2.5 |
| C$_3$H$_6$ conc. in vapor phase (mol %) | 60 | 60 | 65 | 64 |
| MFI (g./10 min) | $10^{-5}$ | $1.3 \times 10^{-3}$ | $3 \times 10^{-6}$ | $8 \times 10^{-6}$ |
| [η] (dl/g.) | 14.1 | 7.2 | 15.3 | 14.3 |
| Total polymer | | | | |
| Yield (g) | 480 | 442 | 480 | 484 |
| Cat. eff. CE (g/g) | 24,000 | 22,100 | 24,000 | 24,200 |
| Weight ratios in 1st-2nd stages (%) | 97-3 | 68-32 | 85-15 | 85-15 |
| Isotactic index I.I. (%) | 96.8 | 90.8 | 94.8 | 95.1 |
| Bulk density $\rho_B$(g./cc) | 0.45 | 0.29 | 0.43 | 0.44 |
| C$_2$H$_4$ content [E]$_{IR}$ (%) | 2.0 | 11.2 | 4.9 | 5.0 |
| MFI (g./10 min) | 4.9 | 2.2 | 1.8 | 6.8 |
| Density ρ(g./cc) | 0.905 | 0.893 | 0.898 | 0.901 |
| 1st yield strength YS (kg./cm$^2$) | 307 | 197 | 252 | 257 |
| Izod impact strength (kg.cm/cm) | 4.1 | >45 | 19.3 | 13.2 |
| Breaking point elongation at welded part (%) | 850 | 595 | 601 | 580 |
| Brittle point temp. T$_b$ (°C.) | −3 | −48 | −23 | −19 |

REFERENCES 4 and 5

In accordance with the process of Example 1 except varying the concentration of hydrogen in the vapor phase and the reaction temperature in the second stage and varying a ratio of the propylene-ethylene random copolymer to 3% by weight or 32% by weight based on a total of propylene-ethylene block copolymer and other polymers.

As shown in Table 3, when the ratio was 3% by weight, the effect for improving the impact strength was not satisfactory, whereas when the ratio was 32% by weight, the block copolymer had a bulk density of 0.29 g./cc, a repose angle of 65°, a slip angle of 63° and inferior free fluidity and had a remarkably low first yield strength in the physical characteristics.

EXAMPLES 6 and 7

In accordance with the process of Example 1 except using the titanium trichloride type catalyst obtained in Preparation of Catalyst 2 and varying the concentration of hydrogen in the vapor phase as shown in Table 3, polymerizations were carried out. The results of the measurements are shown in Table 3. The catalyst prepared in Preparation of Catalyst 2 imparted excellent characteristics as those of the catalyst prepared in Preparation of Catalyst 1, to obtain a powdery block copolymer having excellent free fluidity without aggregate. Even though the non-crystalline polymers are not removed, the product had excellent high first yield strength and Izod impact strength and low brittle point temperature.

EXAMPLES 8 and 9

In accordance with the process of Example 7 except varying the polymerization temperature for forming the propylene-ethylene random copolymer in the second stage to 50° C. or 60° C., polymerizations were carried out. The results of the measurements are shown in Table 4.

As shown in Table 4, when the polymerization temperature in the second stage was 60° C., a product having excellent free fluidity without aggregation of particles of the polymer and having high Izod impact strength and high first yield strength as physical characteristics could be obtained.

EXAMPLES 10 and 11

In accordance with the process of Example 6 except varying the concentrations of propylene and hydrogen in the vapor phase in the second stage, polymerizations were carried out to obtain each propylene-ethylene block copolymer. The results of the measurements are shown in Table 4.

TABLE 4

|  | Exp. 8 | Exp. 9 | Exp. 10 | Exp. 11 |
|---|---|---|---|---|
| First stage | | | | |
| Temp. and time for polymerization(°C.; hr.) | 70-3.5 | 70-3.5 | 70-3.5 | 70-3.5 |
| Total pressure for polymerization(kg./cm$^2$) | 35.3 | 35.3 | 34.3 | 33.2 |
| H$_2$ partial pressure 70° C. (kg./cm$^2$) | 5.3 | 5.3 | 4.3 | 3.2 |
| MFI (g./10 min) | 32.7 | 30 | 17.2 | 7.8 |

TABLE 4-continued

|  | Exp. 8 | Exp. 9 | Exp. 10 | Exp. 11 |
|---|---|---|---|---|
| Second stage | | | | |
| Temp. and time for polymerization(°C.; hr.) | 50-0.5 | 60-0.4 | 40-0.6 | 40-0.5 |
| Total pressure for polymerization(kg./cm$^2$) | 31 | 39.8 | 29 | 25 |
| H$_2$ conc. in vapor phase (mol %) | 1.1 | 0.8 | 0.6 | 1.8 |
| C$_3$H$_6$ conc. in vapor phase (mol %) | 65 | 66 | 55 | 73 |
| MFI (g./10 min) | $7 \times 10^{-6}$ | $9 \times 10^{-6}$ | $10^{-7}$ | $8 \times 10^{-6}$ |
| [$\eta$] (dl/g.) | 14.5 | 14.2 | 20 | 14.3 |
| Total polymer | | | | |
| Yield (g) | 474 | 482 | 483 | 466 |
| Cat. eff. CE (g/g) | 23,700 | 24,100 | 24,100 | 23,300 |
| Weight ratios in 1st-2nd stages (%) | 85-15 | 85-15 | 84-16 | 85-15 |
| Isotactic index I.I. (%) | 95.0 | 95.3 | 95.3 | 95.6 |
| Bulk density $\rho_B$(g./cc) | 0.45 | 0.41 | 0.45 | 0.44 |
| C$_2$H$_4$ content [E]$_{IR}$ (%) | 5.0 | 5.1 | 5.8 | 3.2 |
| MFI (g./10 min) | 6.7 | 6.3 | 1.7 | 2.0 |
| Density $\rho$(g./cc) | 0.891 | 0.892 | 0.899 | 0.898 |
| 1st yield strength YS (kg./cm$^2$) | 254 | 250 | 245 | 250 |
| Izod impact strength (kg.cm/cm) | 14.2 | 13.5 | 19.5 | 21.1 |
| Breaking point elongation at welded part (%) | 552 | 543 | 610 | 603 |
| Brittle point temp. T$_b$ (°C.) | −23 | −21 | −26 | −17 |

REFERENCE 6

In accordance with the process of Example 8 except varying the concentration of propylene in the vapor phase to 95 mol % and the concentration of hydrogen in the vapor phase to 0.4 mol % in the second stage, polymerizations were carried out to obtain a propylene-ethylene block copolymer. The results of the measurements are shown in Table 5. The improvement of Izod impact strength was not satisfactory.

EXAMPLES 12 and 13

In accordance with the process of Example 7 except varying the concentration of hydrogen in the first stage and the ratio of the propylene-ethylene random copolymer in the second stage as shown in Table 5, polymerizations were carried out to obtain propylene-ethylene block copolymers.

The results of the measurements are shown in Table 5. Even though MFI of the propylene-ethylene block copolymers is varied, the product had excellent Izod impact strength and first yield strength.

In usual, when MFI of a propylene-ethylene block copolymer is higher, an impact strength is lower. When a rigidity is kept in higher level, the impact strength is further lowered.

In accordance with the process of the present invention, as it is clear in Example 12, even though MFI was high as 26.5, the propylene-ethylene block copolymer having high impact strength could be obtained.

EXAMPLE 14

In accordance with the process of Example 11 except varying the reaction temperature for the propylene-ethylene random copolymerization in the second stage to 65° C., polymerizations were carried out to obtain the propylene-ethylene block copolymer. The results of the measurements are shown in Table 5.

The resulting powdery propylene-ethylene block copolymer had a repose angle of 42° and a slip angle of 39° and had excellent free fluidity without aggregation of particles and had excellent balanced impact strength and rigidity in the physical characteristics.

TABLE 5

|  | Ref. 6 | Exp. 12 | Exp. 13 | Exp. 14 |
|---|---|---|---|---|
| First stage | | | | |
| Temp. and time for polymerization(°C.; hr.) | 70-3.5 | 70-3.5 | 70-3.5 | 70-3.5 |
| Total pressure for polymerization(kg./cm$^2$) | 32.9 | 36.8 | 32.9 | 32.7 |
| H$_2$ partial pressure 70° C. (kg./cm$^2$) | 2.9 | 6.8 | 2.9 | 2.7 |
| MFI (g./10 min) | 6.4 | 81.0 | 6.5 | 5.4 |
| Second stage | | | | |
| Temp. and time for polymerization(°C.; hr.) | 50-1.0 | 40-0.4 | 40-0.5 | 65-0.3 |
| Total pressure for polymerization(kg./cm$^2$) | 21.0 | 26.1 | 24.5 | 39.1 |
| H$_2$ conc. in vapor phase (mol %) | 0.4 | 2.7 | 1.7 | 0.5 |
| C$_3$H$_6$ conc. in vapor phase (mol %) | 95 | 66 | 69 | 73 |
| MFI (g./10 min) | $9 \times 10^{-5}$ | $3 \times 10^{-5}$ | $5 \times 10^{-6}$ | $10^{-5}$ |
| [$\eta$] (dl/g.) | 11.3 | 13.7 | 15.0 | 14.1 |
| Total polymer | | | | |
| Yield (g) | 465 | 458 | 460 | 465 |
| Cat. eff. CE (g/g) | 23,300 | 22,900 | 23,000 | 23,200 |
| Weight ratios in 1st-2nd stages (%) | 88-12 | 89-11 | 89-11 | 89-11 |
| Isotactic index I.I. (%) | 96.5 | 95.9 | 95.2 | 95.1 |
| Bulk density $\rho_B$(g./cc) | 0.46 | 0.43 | 0.45 | 0.44 |
| C$_2$H$_4$ content [E]$_{IR}$ (%) | 1.4 | 3.5 | 3.3 | 9.0 |
| MFI (g./10 min) | 2.9 | 26.5 | 2.3 | 2.1 |
| Density $\rho$(g./cc) | 0.896 | 0.899 | 0.903 | 0.900 |
| 1st yield strength YS (kg./cm$^2$) | 242 | 268 | 279 | 258 |
| Izod impact strength (kg.cm/cm) | 12.3 | 8.3 | 15.2 | 19.5 |
| Breaking point elongation at welded part (%) | 510 | 520 | 589 | 810 |
| Brittle point temp. T$_b$ (°C.) | −5 | −18 | −18 | −16 |

REFERENCE 7

In accordance with the process of Example 14 except varying the reaction temperature for the propylene-ethylene random copolymerization in the second stage to 75° C., polymerizations were carried out. The results of the measurements are shown in Table 6. The product was a powdery copolymer having poor free fluidity with many aggregated masses.

EXAMPLES 15 and 16

In accordance with the process of Example 4 except using the titanium trichloride catalyst obtained in Preparation of Catalyst 3 and varying the concentration of hydrogen in the vapor phase as shown in Table 6, polymerizations were carried out. The results of the measurements are shown in Table 6. The resulting powdery propylene-ethylene block copolymers had excellent free fluidity.

The powdery copolymer obtained in Example 15 had a repose angle of 45° and a slip angle of 44° and the powdery copolymer obtained in Example 16 had a repose angle of 43° and a slip angle of 42°. The effects for improving the impact strength and the first yield strength were also found in the physical characteristics.

REFERENCE 8

In accordance with the process of Example 1 except using 150 mg. of a commercial titanium trichloride complex of $TiCl_3 \cdot \frac{1}{3} AlCl_3$ manufactured by Stauffer Chem. instead of titanium trichloride catalyst of Preparation of Catalyst 1 and using 5 m mol of di-n-propylaluminum monochloride instead of 2 m mol, polymerizations were carried out.

The results of the measurements are shown in Table 6. The powdery copolymer had poor free fluidity with many aggregated masses. On the inner wall of the autoclave, a rubber-like product was adhered and the product had a low first yield strength in the physical characteristics. It is necessary to separate non-crystalline polymers in order to obtain a copolymer having high rigidity.

EXAMPLE 17

In accordance with the process of Example 9 except varying the concentrations of propylene and hydrogen in the vapor phase in the second stage as shown in Table 6, polymerizations were carried out to obtain propylene-ethylene block copolymer. The results of the measurements are shown in Table 6. As a result of the measurement of Izod impact strength at a low temperature, it was 9.0 kg.cm/cm at 0° C. and 7.1 kg.cm/cm at $-20°$ C.

catalyst complex having an atomic ratio of Al to Ti of less than 0.15 and containing a complexing agent, comprising:
(a) a first stage of polymerizing propylene in the presence of liquid propylene and hydrogen, thereby producing a propylene homopolymer having a melt flow index of 1–150 in an amount of 70% to 95% by wt. based on the total amount of block copolymer; and
(b) a second stage of copolymerizing propylene and ethylene at a temperature of 25° C. to 70° C. in the presence of hydrogen and liquid propylene at a concentration of propylene in the vapor phase based on the total amount of propylene and ethylene in the vapor phase of 50–85 mole % and at a concentration of hydrogen in the vapor phase based on the total amount of propylene and ethylene in the vapor phase of 0.5–30 mole %, thereby producing an ethylene-propylene random copolymer having a melt flow index of $10^{-7}$–0.1 in an amount of 5–30% by wt. based on the total amount of block copolymer material.

2. The process of claim 1, wherein said solid titanium trichloride catalyst complex comprises a titanium trichloride component; an aluminum halide component having the formula:

$$AlR^3_p X_{3-p}$$

TABLE 6

| | Ref. 7 | Exp. 15 | Exp. 16 | Ref. 8 | Exp. 17 |
|---|---|---|---|---|---|
| First stage | | | | | |
| Temp. and time for polymerization(°C.; hr.) | 70-3.5 | 70-4.0 | 70-4.0 | 70-3.5 | 70-3.5 |
| Total pressure for polymerization(kg./cm$^2$) | 32.7 | 32.9 | 35.3 | 33.3 | 33.7 |
| H$_2$ partial pressure 70° C. (kg./cm$^2$) | 2.7 | 2.9 | 5.3 | 3.3 | 3.7 |
| MFI (g./10 min) | 5.3 | 6.9 | 32.7 | 7.7 | 15.2 |
| Second stage | | | | | |
| Temp. and time for polymerization(°C.; hr.) | 75-0.25 | 40-0.6 | 40-0.6 | 40-0.5 | 60-0.5 |
| Total pressure for polymerization(kg./cm$^2$) | 49.9 | 26.3 | 26.1 | 28.5 | 33.0 |
| H$_2$ conc. in vapor phase (mol %) | 0.4 | 2.8 | 2.2 | 4.0 | 0.8 |
| C$_3$H$_6$ conc. in vapor phase (mol %) | 74 | 66 | 65 | 61 | 75 |
| MFI (g./10 min) | $5 \times 10^{-6}$ | $9 \times 10^{-6}$ | $5 \times 10^{-6}$ | $2 \times 10^{-5}$ | $2 \times 10^{-5}$ |
| [η] (dl/g.) | 15.0 | 14.2 | 15.0 | 14.1 | 14.1 |
| Total polymer | | | | | |
| Yield (g) | 451 | 468 | 476 | 362 | 482 |
| Cat. eff. CE (g/g) | 22,500 | 23,300 | 23,800 | 2,400 | 24,100 |
| Weight ratios in 1st-2nd stages (%) | 89-11 | 85-15 | 85-15 | 87-13 | 85-15 |
| Isotactic index I.I. (%) | 90.9 | 91.0 | 90.5 | 80.5 | 95.6 |
| Bulk density $\rho_B$(g./cc) | — | 0.38 | 0.39 | — | 0.44 |
| C$_2$H$_4$ content [E]$_{IR}$ (%) | 2.8 | 4.7 | 4.8 | 4.6 | 3.9 |
| MFI (g./10 min) | 1.9 | 2.4 | 6.2 | 2.5 | 2.0 |
| Density ρ(g./cc) | 0.898 | 0.895 | 0.899 | 0.898 | 0.901 |
| 1st yield strength YS (kg./cm$^2$) | 245 | 258 | 260 | 208 | 265 |
| Izod impact strength (kg.cm/cm) | 25.5 | 13.0 | 13.5 | 10 | 14.9 |
| Breaking point elongation at welded part (%) | 552 | 595 | 590 | 585 | 612 |
| Brittle point temp. T$_b$ (°C.) | −16 | −23 | −23 | −21 | −24 |

We claim:

1. A process for producing a propylene-ethylene block copolymer in two stages of polymerization in the presence of a catalyst system comprising an organo aluminum compound and a solid titanium trichloride catalyst complex having an atomic ratio of Al to Ti of less than 0.15 and containing a complexing agent, comprising:

wherein R$^3$ represents a C$_1$–C$_{20}$ hydrocarbon moiety, X represents a halogen atom, and $0 \leq p \leq 2$, the amounts of said aluminum halide and titanium trichloride components being such that the atomic ratio of Al to Ti is less than 0.15; and a complexing agent, the molar ratio of said complexing agent relative to said titanium trichloride and aluminum halide components being more than 0.001.

3. The process of claim 1 or 2, wherein said solid titanium trichloride catalyst complex has an integrated micropore volume of more than 0.02 cm$^3$/g and a pore radii of 20–500 Å as measured by a mercury porosimeter.

4. The process of claim 1 or 2, wherein said solid titanium trichloride catalyst complex is obtained by precipitation from a solution of titanium trichloride in an ether or a thioether at a temperature less than 150° C.

5. The process of claim 1 or 2, wherein said solid titanium trichloride catalyst complex is obtained by reducing titanium tetrachloride with an organoaluminum compound or metallic aluminum and treating the resulting solid titanium trichloride with a complexing agent and a halide.

6. The method of claim 1, wherein the amount of hydrogen in the vapor phase in said first stage ranges from 1 to 30 mole %.

7. The method of claim 1, wherein the content of propylene in the random copolymer produced in said second stage ranges from 30% to 70% by wt.

8. The method of claim 1, wherein the temperature of polymerization in said first stage ranges from 40° to 100° C.

9. The method of claim 1, wherein the polymerization of propylene in said first stage is conducted in an inert liquid hydrocarbon selected from the group consisting of aliphatic hydrocarbons, alicyclic hydrocarbons and aromatic hydrocarbons.

* * * * *